United States Patent
Ravestein et al.

(10) Patent No.: US 11,230,170 B2
(45) Date of Patent: Jan. 25, 2022

(54) MOTOR VEHICLE HAVING AN INTERIOR ACCESSIBLE VIA A DOOR OPENING

(71) Applicant: Daimler AG, Stuttgart (DE)

(72) Inventors: Matthijs Ravestein, Boeblingen (DE); Wolfram Judenhahn, Leutenbach (DE); Jochen Bisinger, Esslingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 16/955,283

(22) PCT Filed: Nov. 9, 2018

(86) PCT No.: PCT/EP2018/080710
§ 371 (c)(1),
(2) Date: Jun. 18, 2020

(87) PCT Pub. No.: WO2019/120739
PCT Pub. Date: Jun. 27, 2019

(65) Prior Publication Data
US 2020/0391580 A1    Dec. 17, 2020

(30) Foreign Application Priority Data

Dec. 22, 2017    (DE) .................... 10 2017 011 996.1

(51) Int. Cl.
*B60J 5/04* (2006.01)
*B60J 7/16* (2006.01)
*B60J 5/06* (2006.01)

(52) U.S. Cl.
CPC ............ *B60J 5/047* (2013.01); *B60J 7/1657* (2013.01); *B60J 5/06* (2013.01); *B60J 7/165* (2013.01)

(58) Field of Classification Search
CPC . B60J 5/0473; B60J 5/047; B60J 7/165; B60J 7/1657; B60P 3/34
USPC ..... 296/164, 171, 173, 26.05, 26.06, 146.13
See application file for complete search history.

(56) References Cited

U.S. PATENT DOCUMENTS

| | | | | |
|---|---|---|---|---|
| 2,944,852 A | * | 7/1960 | Snyder | B60P 3/34 52/67 |
| 3,588,167 A | * | 6/1971 | Ratcliff | B60P 3/34 296/171 |
| 3,632,153 A | * | 1/1972 | Knudsen | B60P 3/34 296/169 |

(Continued)

FOREIGN PATENT DOCUMENTS

| DE | 655 225 C | 1/1938 |
|---|---|---|
| DE | 20 2007 003 110 U1 | 9/2007 |

(Continued)

OTHER PUBLICATIONS

PCT/EP2018/080710, International Search Report dated Feb. 22, 2019 (Three (3) pages).

*Primary Examiner* — Jason S Morrow
(74) *Attorney, Agent, or Firm* — Crowell & Moring LLP

(57) ABSTRACT

A motor vehicle has an interior which is accessible via a door opening which can be closed by a door and which can be enlarged from a driving position into a parking position by displacing a vehicle roof region delimiting the door opening. The vehicle roof region can be moved along as part of the at least substantially entire vehicle roof which can be displaced between the driving position and the parking position relative to a lower vehicle body part. The door is mounted on the displaceable vehicle roof.

8 Claims, 6 Drawing Sheets

(56) References Cited

U.S. PATENT DOCUMENTS

| | | | | |
|---|---|---|---|---|
| 3,709,551 | A * | 1/1973 | McCarthy | B60P 3/34 296/170 |
| 3,768,855 | A * | 10/1973 | Laue | B60P 3/34 296/26.02 |
| 4,807,924 | A * | 2/1989 | Kottke | B60P 3/34 296/164 |
| 5,028,088 | A * | 7/1991 | Del Monico | B60P 3/34 296/26.04 |
| 5,135,278 | A * | 8/1992 | Kauffman | B60P 3/34 296/170 |
| 5,505,515 | A * | 4/1996 | Turner | B60P 3/341 135/88.01 |
| 5,961,176 | A * | 10/1999 | Tilly | B60P 3/341 296/165 |
| 6,439,647 | B1 * | 8/2002 | Baldwin | B60J 7/1657 296/164 |
| 6,840,569 | B1 * | 1/2005 | Leigh | B60P 3/34 296/173 |
| 10,372,130 | B1 * | 8/2019 | Kaushansky | B60W 60/001 |
| 2013/0026780 | A1 * | 1/2013 | Hanson | B60P 3/34 296/121 |
| 2017/0335561 | A1 * | 11/2017 | Wickramasekera | E04B 1/34357 |

FOREIGN PATENT DOCUMENTS

| | | |
|---|---|---|
| DE | 20 2009 002 125 U1 | 6/2009 |
| DE | 10 2014 008 805 A1 | 12/2015 |
| DE | 10 2015 120 208 A1 | 5/2017 |
| EP | 2 657 055 A2 | 10/2013 |
| JP | 1-174220 U | 12/1989 |
| JP | 1-175423 U | 12/1989 |
| JP | 3-38429 A | 2/1991 |
| JP | 4-25117 U | 3/1992 |
| JP | 2004-9754 A | 1/2004 |

\* cited by examiner

MOTOR VEHICLE HAVING AN INTERIOR ACCESSIBLE VIA A DOOR OPENING

BACKGROUND AND SUMMARY OF THE INVENTION

The invention relates to a motor vehicle having an interior which is accessible via a door opening that can be closed by a door.

In general, different concepts of motor vehicles are known whose interiors are accessible via at least one door opening that can be closed by an assigned door. Especially in passenger cars, but also in minibuses, there is the problem that on the one hand, for reasons of streamlining and everyday usability, they have an overall height of their vehicle roof, which should be at least sufficiently low in order to achieve a favorable use and, in addition, in parking garages or the like, for example, they should be able to guarantee entry even with relatively low ceiling height and also sufficient maneuverability. On the other hand, it is desirable, especially when getting in and out of the car, to be able to reach your seat as comfortably as possible within the interior of the car or to get out of the car.

For this reason, vehicle concepts are already known in which the door opening for getting in and out can be enlarged in order to make it more comfortable. Examples of this can be found in DE 20 2007 003 110 UI or EP 2 657 055 A2. In this case, a vehicle roof region limiting the door opening in a driving position is moved into a parking position in order to facilitate the entry and exit of a corresponding seat occupant by enlarging the corresponding door opening. However, despite these already moveable vehicle roof regions, a comfortable entry and exit is only possible to a limited extent.

From DE 10 2014 008 805 A1 and DE 10 2015 120 208 A1, a passenger car emerges in each case having a roof which is height-adjustable relative to the vehicle floor by means of an adjusting device and which can be lowered during driving from a raised normal position into a corresponding energy-saving position for the purpose of reducing the air resistance of the passenger car.

The object of the present invention is to create a motor vehicle of the type mentioned above, which enables the entry and exit of a seat occupant in an even more comfortable manner.

In order to create a motor vehicle of the aforementioned type with a more comfortable entry and exit of the interior, it is provided in accordance with the invention that the vehicle roof area, which in the driving position delimits the door opening, is displaceable as part of the at least substantially entire vehicle roof which is displaceable between the driving position and the parking position relative to a lower vehicle body part, and that the door is supported on the displaceable vehicle roof. In accordance with the invention, it is therefore provided that the entire vehicle roof can be displaced from the driving position into the at least one parking position if necessary, whereby the vehicle roof region delimiting the door opening, for example upwards, is simultaneously moved along and the door opening is thus correspondingly enlarged. The result is not only an enlargement of the door opening, but also an enlargement of the entire interior of the motor vehicle, which is covered by the raised vehicle roof. This not only makes it easier for a respective seat occupant to get in and out, but also allows them to move more comfortably, in particular upright, within the interior of the motor vehicle. The vehicle roof can be arranged not only for simply entry and exit in the raised parking position, but also, for example, over a longer period of time. On the one hand, it is conceivable to operate the motor vehicle with the vehicle roof raised, in particular in the parking position. This has the particular advantage of a favorable entry and exit position. On the other hand, however, it would also be conceivable to leave the vehicle roof in the raised parking position during certain phases of driving, for example outside built-up areas or when driving situations are not restricted. Due to the fact that the door is mounted on the displaceable vehicle roof, it is easily moved along with the vehicle roof when the vehicle roof is displaced, such that the door can be accommodated in the region of the vehicle roof for example, which is otherwise no longer needed.

In a further embodiment of the invention, it has been shown to be advantageous if the vehicle roof can be displaced in the region of a beltline relative to the lower part of the vehicle body. It has been shown that a separation between the vehicle rood and the vehicle body part, especially in the region of the beltline, can be achieved in a particularly simple way and can be laminated in terms of design.

A further advantageous embodiment of the invention provides that the vehicle roof can be displaced telescopically relative to the lower vehicle body part. Such a telescopic displacement movement is on the one hand particularly reliable in operation and on the other hand enables the use of an inherently rigid vehicle roof.

A further advantageous embodiment of the invention provides that at least one window part is assigned to the displaceable vehicle roof. Thus, the respective position of the vehicle roof allows the corresponding position of the window part to be varied. In this context, it has been shown to be further advantageous if a clear viewing area through the at least one window part arranged on the displaceable vehicle roof varies depending on the position of the displaceable vehicle roof. In other words, the glass area of the window part can be easily adjusted depending on the height of the vehicle roof.

In a further embodiment of the invention, the door of the door opening can be enlarged between a driving position and a parking position. Thus, a closed interior can also be provided in the parking position of the vehicle roof, since the door can also be displaced into a parking position.

In a further embodiment of the invention, the displaceable vehicle roof is covered with inherently rigid cladding elements. This results in an overall fixed assembly of the vehicle roof, which has a correspondingly high stability.

Alternatively, the displaceable vehicle roof is covered with at least one flexible cladding element. This makes it possible to implement a vehicle roof that is particularly easy to displace.

Finally, the variable interior created here is suitable for autonomously driven motor vehicles, as these offer a wide range of application possibilities in which the advantages of a raised vehicle roof can be used.

Further advantages, features and details of the invention emerge from the following description of preferred exemplary embodiments and from the drawings. The features and combinations of features mentioned above in the description as well as the features and combinations of features mentioned in the following figure descriptions and/or shown in the Figures alone can be used not only in the combination specified in each case, but also in other combinations or on their own without leaving the scope of the invention.

DETAILED DESCRIPTION OF THE DRAWINGS

Figure 1:
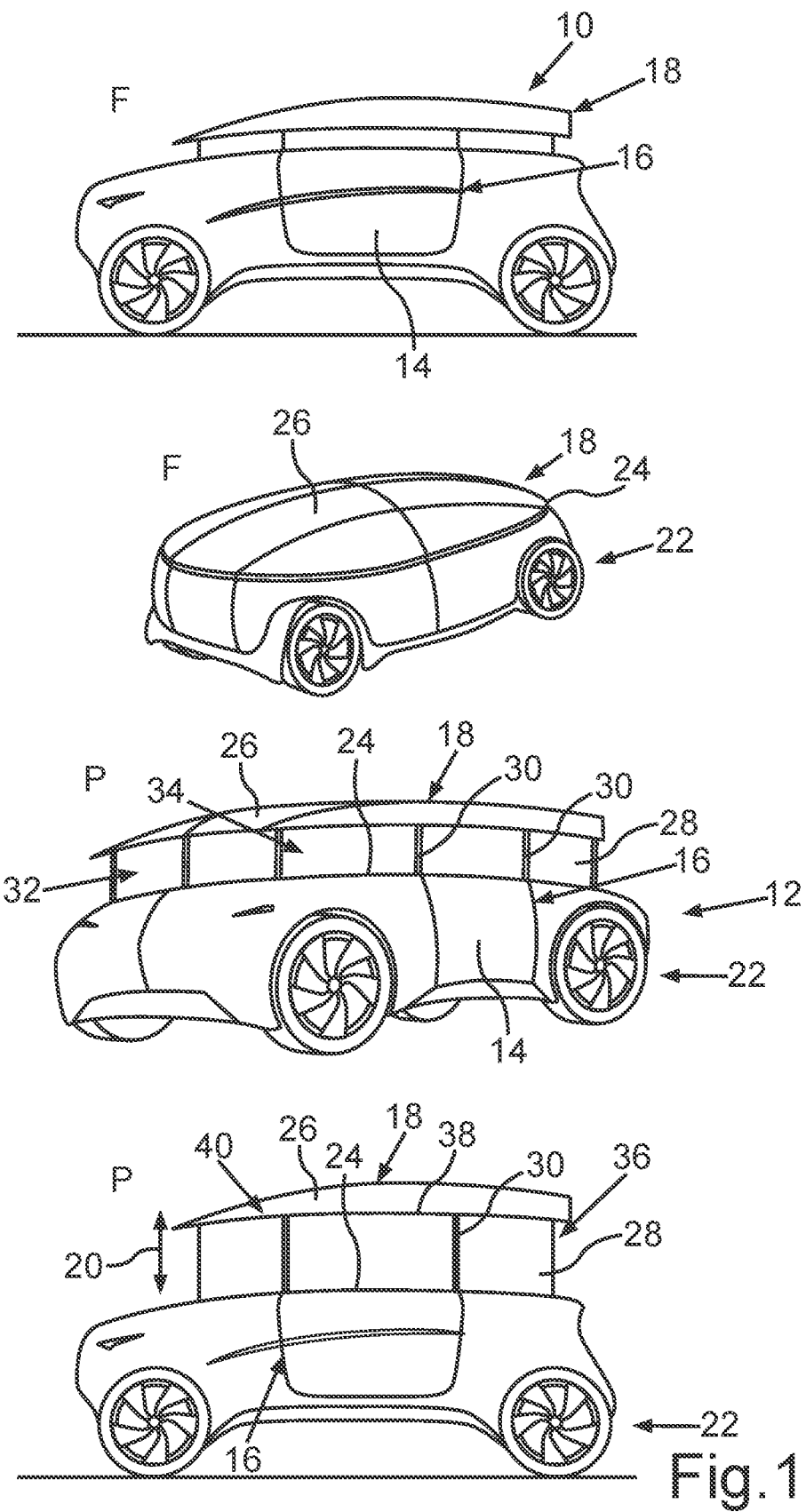
FIG. 1 provides two respective side or perspective views of a motor vehicle according to a first embodiment having an interior which is accessible via a door opening which can be closed by a door and which can be enlarged from a driving position into a parking position by displacing a roof region delimiting the door opening, which in turn can be moved along as part of the at least substantially entire vehicle roof which can be displaced between the driving position and the parking position relative to a lower vehicle body part, wherein the vehicle roof can be displaced relative to the lower vehicle body part in the region of a beltline.

In FIG. 1, the two lower pictures show a perspective depiction or a side view of a motor vehicle designed as a passenger car with an interior 10, also referred to as the passenger compartment, which is accessible on at least one vehicle outer side 12, but in this case on both vehicle outer sides 12, via a door opening 16 which can be closed by a door 14.

In conjunction with the two upper pictures from FIG. 1, which also show the motor vehicle in a side view or in a perspective view, it can be seen that the interior 10 of the motor vehicle is surrounded or limited in its upper region by a vehicle roof 18, which—as is indicated by an arrow 20 in the lower picture of FIG. 1—can be shifted in height between a driving position F shown in the two upper pictures and a parking position P shown in the two lower pictures of FIG. 1. The vehicle roof 18 in the present case is therefore designed as a separate unit from a lower vehicle body part 22, the unit, for example, being telescopically displaceable relative to the lower vehicle body part 22, as explained in more detail below. In the present case, the lower vehicle body part 22 extends—at least in the rear region in the manner of a cabriolet—to the height of a beltline 24.

Consequently, the height of the vehicle roof 18 increases or decreases relative to the beltline 24 forming the upper edge of the vehicle body part 22, depending on the height of the vehicle roof 18 between the driving position F and the parking position P. In this connection, it is conceivable on the one hand that the vehicle roof 18 only takes up the respective lower driving position F or the respective upper parking position P. Likewise, however, an adjustment in steps or even a continuous adjustment of the vehicle roof 18 relative to the lower vehicle body part 22 would also be conceivable. This means that the vehicle roof 18 is either continuously adjustable between its two end positions "driving position F and parking position P" or the vehicle roof 18 can be displaced to at least one intermediate position and fixed there.

In particular from the two lower pictures of FIG. 1, it can also be seen that, in the present case, the vehicle roof 18 comprises a flat, here inherently rigid, roof element 26, to which a number of window parts 28 are connected at the bottom. These window parts 28 are, for example, supported on and fastened to the respective roof pillars 30. In the present case, the window parts 28 form, among other things, the front window 32, respective side windows 34 and a rear window 36. In the present case, the window parts are consequently arranged peripherally around the vehicle roof 18 and—as can be seen from the combination of the pictures in FIG. 1—can be moved in terms of height with the vehicle roof 18 or the roof element 26 relative to the lower vehicle body part 22 in a manner described in more detail below.

As can also be seen from the combination of the pictures in FIG. 1, the vehicle roof 18 has a vehicle roof region 38 which delimits the respective door opening 16 upwards, which in the present case is formed in particular at the top by a corresponding partial region 40 of the roof element. The door opening 16 is laterally delimited by the respective window parts 28 of the side windows 34 or by the associated roof pillars 30.

The present motor vehicle is now characterised in that the door opening 16 on each side of the vehicle, via which the interior 10 is accessible, can be enlarged for getting in and out, the corresponding vehicle roof region 38—in the present case, the U-shaped design of the corresponding partial region 40 of the roof element 26 and the window parts 28 laterally adjacent to the door opening 16—can be moved along as part of substantially the entire vehicle roof 18 between the driving position F according to the two upper pictures in FIG. 1 and the parking position P according to the two lower pictures in FIG. 1. For getting into and out of the interior 10, the door opening 16, i.e., its clear headroom, can therefore be increased and the entire vehicle roof 18 raised so that, for example, a person entering the interior 10 can also move very comfortably and, for example, upright within the interior 10 in order to occupy a corresponding seat in the interior. Consequently, for example, not only the door opening 16, but also the preferably at least substantially total height of the interior 10 is increased in the present case by raising the vehicle roof 18, in particular for getting in and out. The parking position P of the vehicle roof 18 can be adjusted not only for getting in and out, but also if the vehicle is parked for a longer period of time. Particularly for slow journeys, such as those which can occur in the case of autonomously driven, i.e., driverless, vehicles, particularly in inner-city areas, the parking position P can also be adjusted to give the vehicle occupants a comfortable feeling of space. Particularly for faster journeys, where the aerodynamics of the vehicle play a significant role, in particular with regard to fuel consumption and the associated quantity of $CO_2$ emissions or electricity consumption in the case of electrically powered vehicles, or when maneuvering the vehicle, for example in parking garages or where space is limited, the driving position F is preferably adjusted in order to provide a vehicle which is as manageable as possible. If necessary, the vehicle roof 18 can also be lowered so that the window parts 28 are completely recessed. This can reduce the risk of break-ins into the interior 10, for example.

When the door opening 16 is enlarging and the vehicle roof 18 is displaced for this purpose, the height of the interior 10 is increased at least substantially across its entire clear area. However, the vehicle roof 18 is at least raised in those regions in which the respective passenger must move in the interior 10 to reach his or her seat.

It should be noted that, in the exemplary embodiment of the vehicle depicted by means of the pictures in FIG. 1, at least one frame-shaped access opening to a passenger compartment is provided, the clear height of which—measured between the longitudinal roof element and the lower region of the access opening—can be enlarged for the purpose of facilitating getting in and out by vertically moving at least one roof part or a body section of the access opening near the roof. In connection with the present invention, the term "vertical movement" is understood to mean a displacement of the vehicle roof in the vertical direction of the vehicle, which is also referred to as the z-direction in the coordinate system usually used in vehicle construction. The displacement of the vehicle roof thus takes place orthogonally or in the orthogonal direction to the road. This vertical displacement is preferably a lifting movement, in particular a linear movement, i.e., the vehicle roof is lifted evenly from the vehicle substructure or moved towards it and placed on it.

Figure 2:
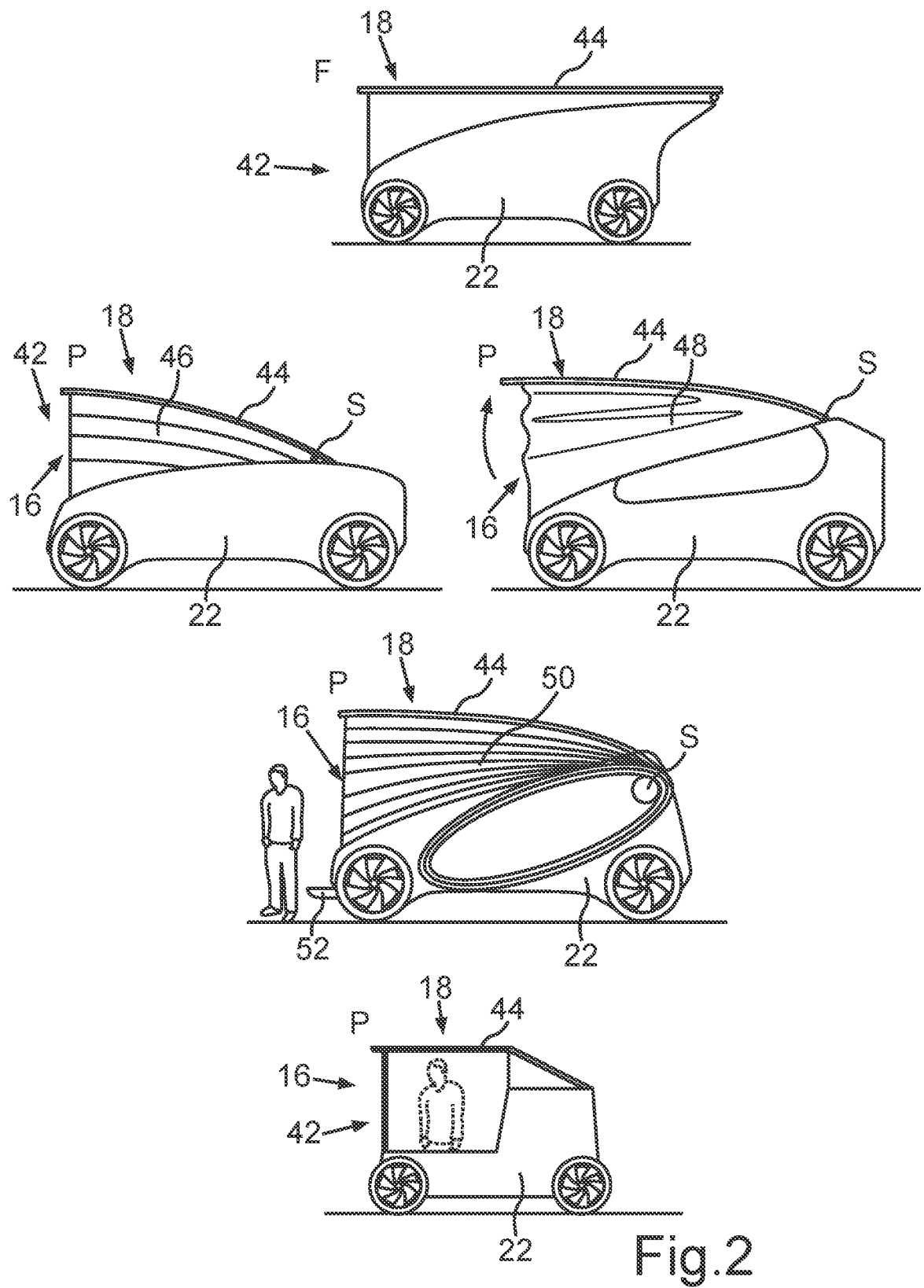
FIG. 2 provides respective schematic side views and a schematic sectional view through a motor vehicle according to a second embodiment, in which the vehicle roof is pivotably mounted in a rear region and can be raised or lowered in a front region, whereby a corresponding door opening can be enlarged for entry and exit into the interior of the motor vehicle.

In FIG. 2, a motor vehicle is depicted in the respective, extremely schematic side views as well as in a schematic sectional view according to a further embodiment. In the present case, the motor vehicle is accessible via a corresponding door opening 16 on its end side 42, in the present case the front end side. A vehicle roof 18 with a roof element 44 is provided in turn here, which is displaceable around an actual or an imagined pivot axis S, which runs in the transverse direction of the vehicle (y-direction in the vehicle-/body construction coordinate system) or horizontally. Consequently, the roof element 44 of the vehicle roof in the present case is moved from a driving position F, in which the roof element 44 rises obliquely from the bottom front to the top rear, for example, to a parking position P, in which the roof element runs approximately horizontally, for example, or falls obliquely from the top front to the bottom rear.

In the region of the respective side walls of the vehicle, the vehicle roof 18 has, for example, respective fan-like side walls 46, bellow-like side walls 48 or telescopically moveable side walls 50, which extend between the roof element 44 and the lower vehicle body part 22.

The opening on the front side of the vehicle is accessible—as shown in the second lowest picture in FIG. 1—by lowering a step tread 52, for example. The door opening 16 itself then extends upwards from the step 52 to the roof element 44. Both the door opening 16 and the roof element 44 are raised in such a way that a person can move at least substantially upright in the interior 10 of the vehicle, as can be seen in the bottommost picture in FIG. 2.

Figure 3:
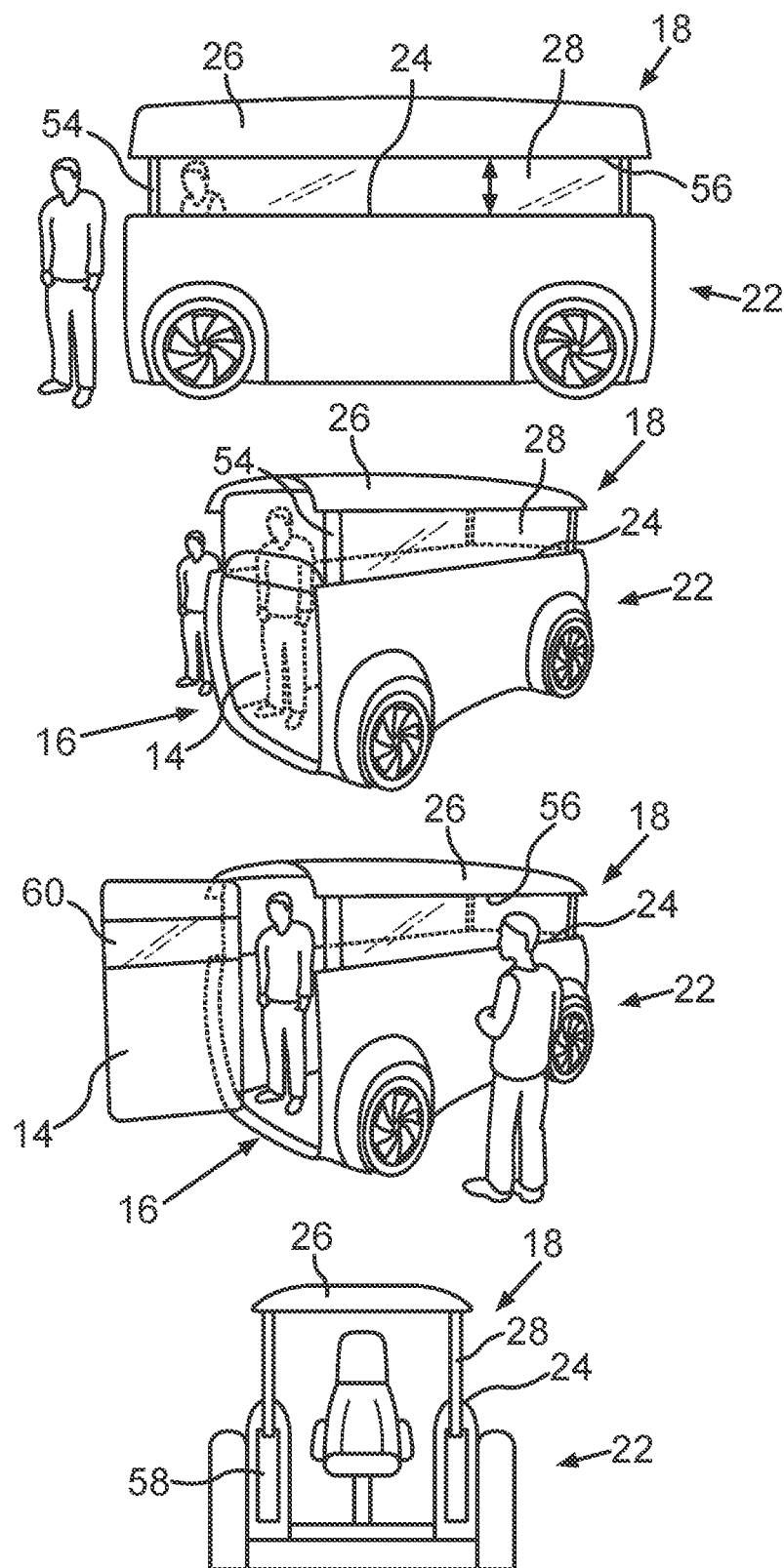
FIG. 3 provides respective side views, perspective views and a schematic sectional view through a motor vehicle according to a third embodiment, in which the vehicle roof can be displaced telescopically relative to the lower vehicle body part in the region of a beltline of the motor vehicle.

In respective side views or perspective views and in a schematic sectional view in the bottommost picture, FIG. 3 shows the vehicle according to a third embodiment. Here, the vehicle roof 18 is telescopically displaceable over respective roof pillars 54, i.e., along a straight guide track relative to the lower vehicle body part 22. Analogously to the embodiment according to FIG. 1, in the exemplary embodiment depicted in FIG. 3, an at least substantially peripheral arrangement of window parts 28 is also attached to the associated roof element 26 and can be displaced with this or the vehicle roof 18 and thus relative to the lower vehicle body part 22. When the vehicle roof 18 is raised and lowered between its driving position F and its parking position P, the clear viewing area through the respective window part thus also changes in the present case, wherein the height of this clear viewing area is determined on the one hand by a lower edge 56 of the roof element and on the other hand by the beltline 24 of the vehicle body part 22.

The height of the vehicle roof 18 relative to the lower vehicle body part 22 can be displaced telescopically, as can be seen from the bottommost picture in FIG. 3. In this case, the respective roof pillars 54 and the window parts 28 can be retracted into or extended from the corresponding recesses 58 of the lower vehicle body section 22. As can be seen in particular from the two central pictures of FIG. 3, the height of the vehicle roof 18 causes a corresponding change in the door opening 16, which is in turn provided on the front side. The door opening 16 is closed by a door 14, which in turn can also be adjusted in height or adapted to the height position of the vehicle roof. The door 14 also has a window part 60, which is matched to the other window parts 28. In the case of a corresponding height displacement of the vehicle roof 18 and thus a height change of the door 14, a telescopic arrangement can be provided in the region of the window part 60, for example, such that the window part 60 also varies in its clear viewing area depending on the height of the vehicle roof 18. The door 14 is pivotably hinged in particular to the lower vehicle body part 22.

Figure 4:
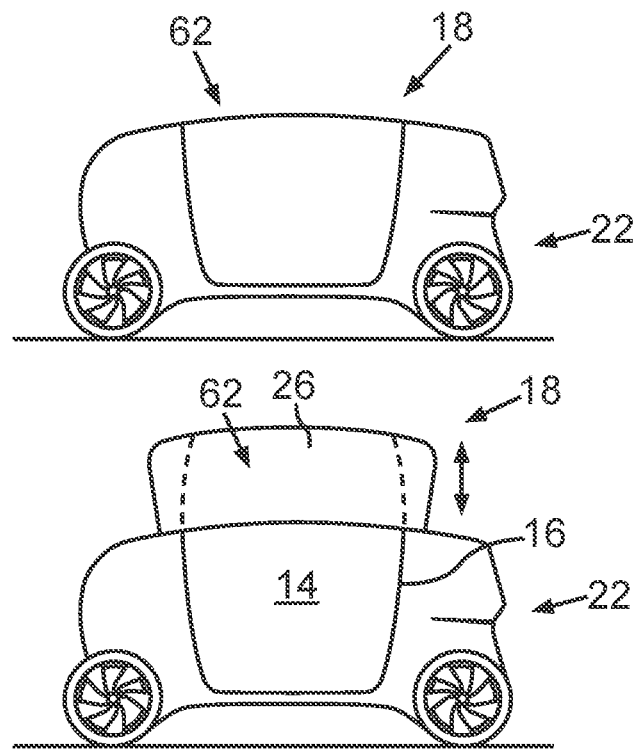
FIG. 4 provides respective side views of a motor vehicle according to a fourth embodiment, in which a vehicle roof of a core comprising the interior is displaceable between the driving position and the parking position.

In FIG. 4, two side views depict a further embodiment of the motor vehicle, in which a core region 62 of the interior 10 of the motor vehicle is covered by a correspondingly height-adjustable vehicle roof 18, which—as can be seen in the lower picture of FIG. 4—can be height-adjusted between the driving position F depicted in the upper picture and the parking position P depicted in the lower picture. It can also be seen that in this core region 62 in the region of at least one vehicle exterior side, the corresponding door opening 16 is provided, which is closed by the door 14. Here, the specific design of the height-adjustable vehicle roof 18 can be based, for example, on the embodiment according to FIG. 1 or the one according to FIG. 2. What is essential for the embodiment according to FIG. 4, however, is that in the present case, that part of the interior 10 be provided with a correspondingly height-adjustable vehicle roof 18, in which the respective passengers have to move upright in order to reach the respective seats, for example. By way of example, in a front region of the interior in which, for example, the instrument panel is arranged, it is not necessary to provide a height-adjustable vehicle roof 18.

Figure 5:
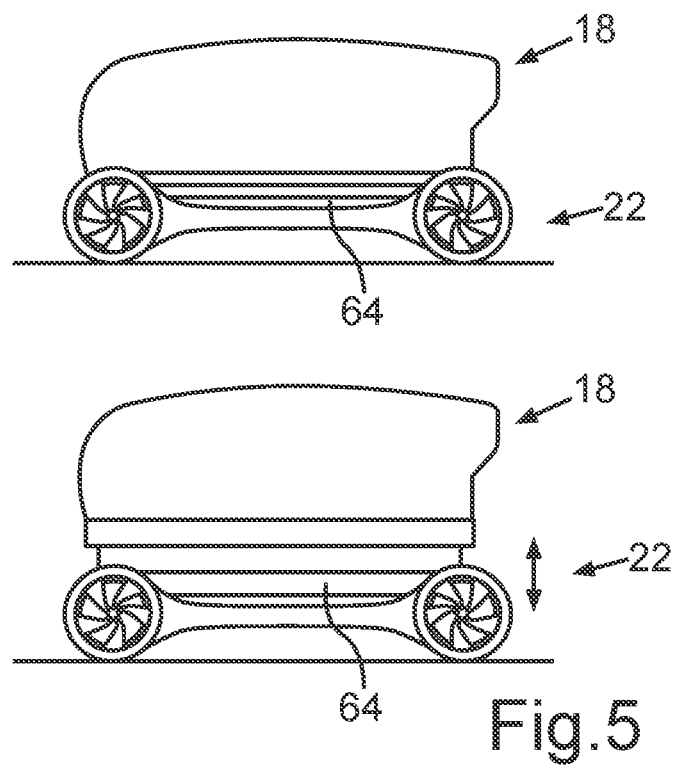
FIG. 5 provides respective side views of a motor vehicle according to a fifth embodiment, in which the vehicle roof is designed as a substantially inherently rigid structural unit which is displaceable relative to a lower vehicle body part comprising respective, flexibly designed cladding elements.

FIG. 5 shows a further embodiment of the motor vehicle in respective side views, in which the adaptability of respective cladding parts 64 in the region of the lower vehicle body part 22 is provided, which is necessary for the height-adjustment of the vehicle roof 18. In contrast in particular to the embodiment according to FIG. 2, in which the side walls 46, 48, 50 provided there for the height adjustment of the vehicle roof 18 can be changed in their shape, the present cladding parts 64 are provided in the region of the lower vehicle body part 22. The vehicle roof 18 therefore consists of at least substantially inherently rigid cladding parts or window parts, whereas in the region of the lower vehicle body part 22, respective cladding parts 64 are provided, which can be displaced relative to one another, for example, in the manner of bellows, fan-like, telescopically or similar, in order to thus create a corresponding shape compensation which is caused by the height displacement of the vehicle roof 18.

Figure 6:
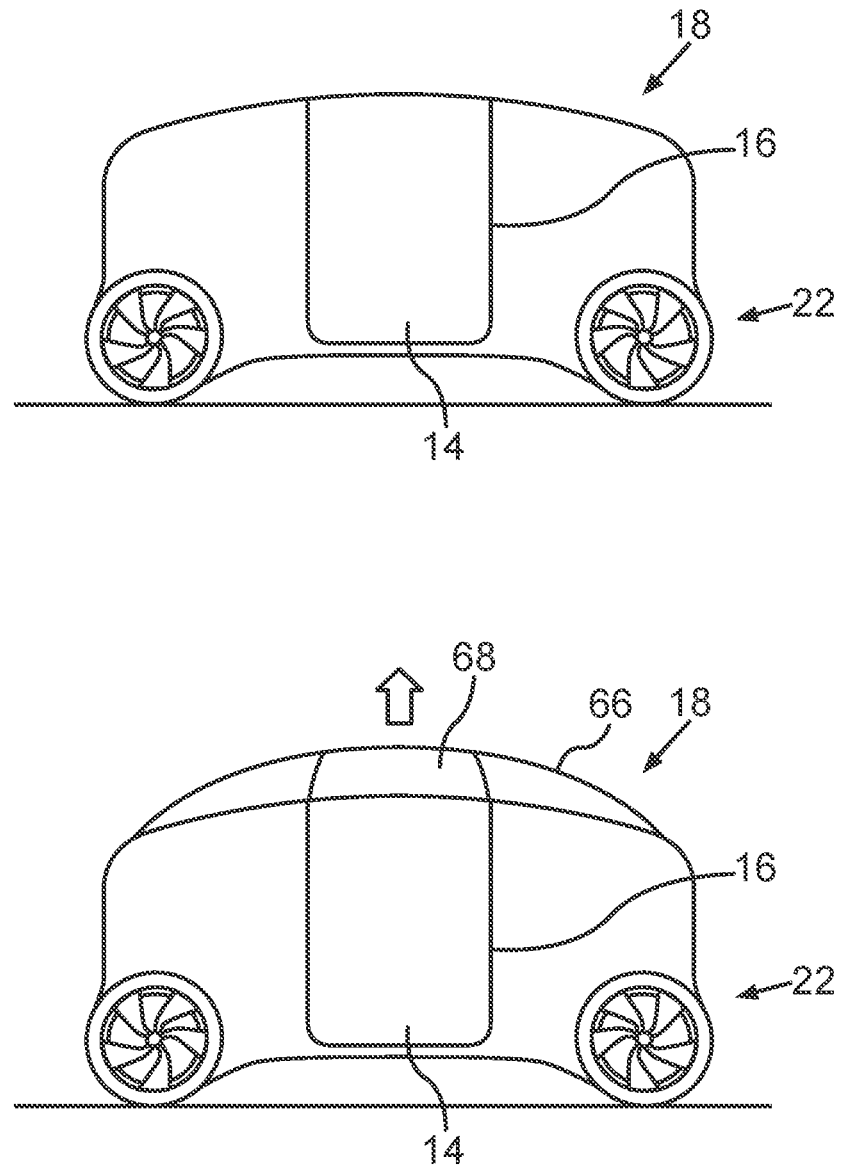
FIG. 6 provides respective side views of a motor vehicle according to a sixth embodiment, in which the vehicle roof is in turn displaceable between a driving position and a parking position, wherein the displaceable vehicle roof is covered with a flexible cladding element.
Figure 7:
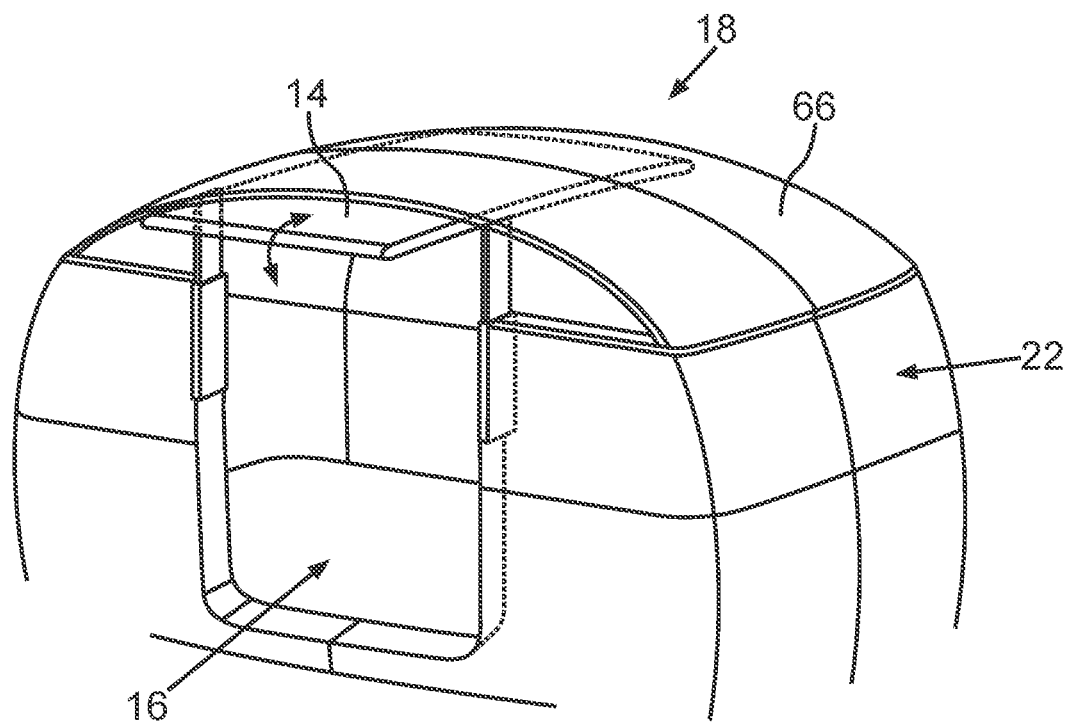
FIG. 7 provides a schematic perspective view and a schematic front view of the motor vehicle according to FIG. 6, wherein in particular the operation of the door opening, which enlarges depending on the displacement of the vehicle roof is depicted with the associated side door.
Figure 7:
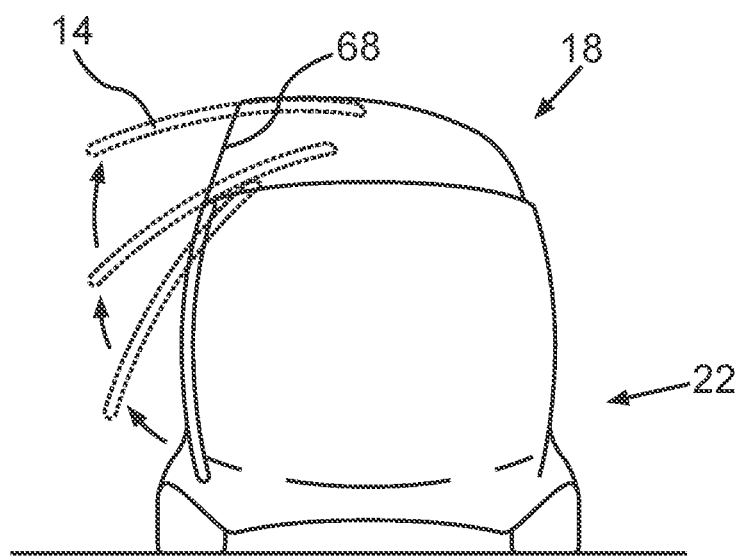

Finally, FIGS. 6 and 7 show an embodiment of the motor vehicle in which the displaceable vehicle roof 18 is covered with a flexible cladding element 66. As can be seen from an overview of the two pictures in FIG. 6, a substructure of the vehicle roof 18 is displaced between the driving position shown in the upper picture and the parking position shown in the lower picture in such a way that the cladding element 66 spanning this substructure is correspondingly deformed. The flexible cladding element 66 can, for example, be a correspondingly resistant material made of fabric, foil or similar. The substructure can, for example, be formed by respective columns, bows or the like. Other types of flexible cladding elements 66 are of course also conceivable.

Particularly when viewed together with the perspective view and the side view in FIG. 7, it becomes clear that in the present case, a door 14 is provided which increases in size around a region 68 when the vehicle roof 18 is raised. In addition, it can be seen that the door 14 in the present case can be moved under a roof element 70 of the vehicle roof 18 in the manner of a wing door with a pivot sliding mechanism. In the open position, the door 14 is located in an approximately parallel arrangement below the roof element 70 of the vehicle roof 18.

Overall, it can be seen from FIGS. 1 to 7 that in the present case, different motor vehicles with associated interiors 10 are created, wherein all of these interiors 10 can be changed in their height by adjusting the height of the vehicle roof 18 in order to ensure the best possible entry and exit or to provide the most comfortable stay within the interior 10. The height displacement of the vehicle roof 18 is accompanied by an enlargement of the clear cross-section of the respective door opening 16, through which the interior 10 is accessible. In this way, the respective door 14 can be hinged and held on sides of the vehicle body part 22 and on sides of the vehicle roof 18, for example.

The invention claimed is:

1. A motor vehicle, comprising:
   an interior which is accessible via a door opening, wherein the door opening is closable by a door and is enlargeable from a driving position into a parking position by displacing a vehicle roof region that delimits the door opening;
   wherein the vehicle roof region is movable along as part of an entire vehicle roof, wherein the vehicle roof is displaceable between the driving position and the parking position relative to a lower vehicle body part,
   wherein the door is mounted on the vehicle roof,
   wherein the door has a rigid shape, and
   wherein the door is a wing door with a pivot sliding mechanism, and the door is displaceable under a roof element of the vehicle roof in a manner of a wing door with a pivot sliding mechanism.

2. The motor vehicle according to claim 1, wherein the vehicle roof is displaceable in a region of a beltline relative to the lower vehicle body part.

3. The motor vehicle according to claim 1, wherein the vehicle roof is telescopically displaceable relative to the lower vehicle body part.

4. The motor vehicle according to claim 1, further comprising a window part on the vehicle roof.

5. The motor vehicle according to claim 4, wherein a clear viewing area through the window part varies depending on a displacement position of the vehicle roof.

6. The motor vehicle according to claim 1, wherein the vehicle roof is covered with inherently rigid cladding elements.

7. The motor vehicle according to claim 1, wherein the vehicle roof is covered with at least one flexible cladding element.

8. The motor vehicle according to claim 1, wherein the motor vehicle is autonomously drivable.

* * * * *